United States Patent [19]

Matthews

[11] 4,082,610

[45] Apr. 4, 1978

[54] SNUBBER ASSEMBLY FOR A CONTROL ROD DRIVE

[75] Inventor: John C. Matthews, Lancaster, Ohio

[73] Assignee: Diamond Power Specialty Corporation, Lancaster, Ohio

[21] Appl. No.: 578,437

[22] Filed: May 16, 1975

[51] Int. Cl.² .......................... G21C 7/08; G21C 9/00; F16F 9/18

[52] U.S. Cl. ................... 176/365; 176/36 R; 176/38; 267/126

[58] Field of Search ............... 176/36 R, 36 C, 36 S, 176/38, 86 R, 86 L, 86 M; 267/126, 127, 137

[56] References Cited

U.S. PATENT DOCUMENTS

| 3,562,109 | 2/1971 | Bezold | 176/36 S |
|---|---|---|---|
| 3,733,251 | 5/1973 | Gilbertson | 176/36 R |
| 3,762,994 | 10/1973 | Künzel | 176/36 S |
| 3,822,439 | 7/1974 | Wallin | 176/36 R |
| 3,980,519 | 9/1976 | Taft | 176/36 R |

Primary Examiner—Stephen C. Bentley
Assistant Examiner—Donald P. Walsh
Attorney, Agent, or Firm—Vytas R. Matas; Joseph M. Maguire

[57] ABSTRACT

A snubber cartridge assembly is mounted to the nozzle of a control rod drive mechanism to insure that the snubber assembly will be located within the liquid filled section of a nuclear reactor vessel whenever the control rod drive is assembled thereto. The snubber assembly includes a piston mounted proximate to the control rod connecting end of the control rod drive leadscrew to allow the piston to travel within the liquid filled snubber cartridge and controllably exhaust liquid therefrom during a "scram" condition. The snubber cartridge provides three separate areas of increasing resistance to piston travel to insure a speedy but safe "scram" of the control rod into the reactor.

10 Claims, 4 Drawing Figures

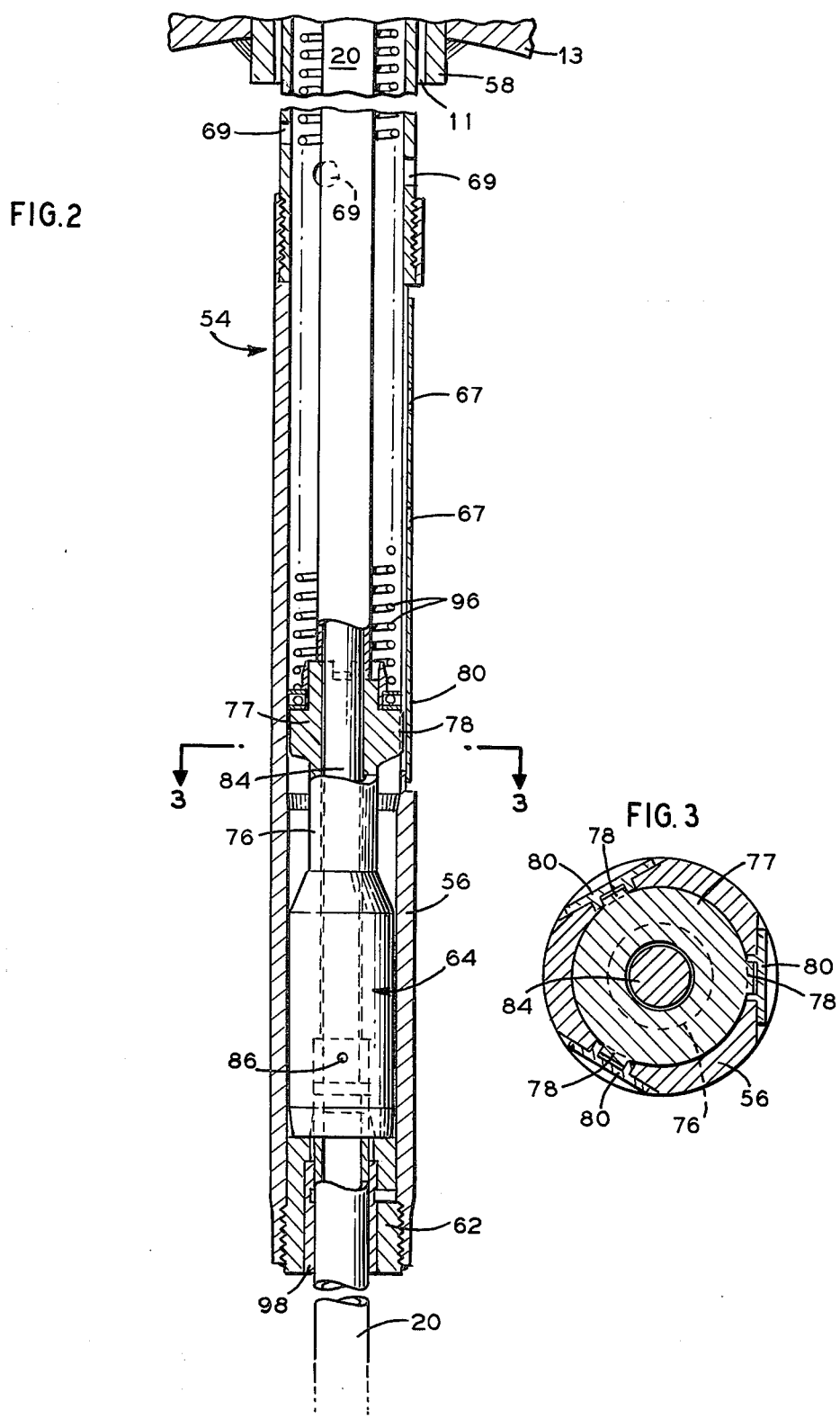

SNUBBER ASSEMBLY FOR A CONTROL ROD DRIVE

The invention described herein was made in the course of or under Contract No. 2-36216 with the Maritime Administration of the Department of Commerce. The Government is licensed under, and on the performance of a condition precedent specified in the Contract, shall acquire the entire right, title and interest in this Application and any resulting patent.

BACKGROUND OF THE INVENTION

1. Field of the Invention

The present invention relates generally to control rod drives for nuclear reactors and particularly to snubbers for such drives which control the speed of control rod drop into the nuclear reactor.

2. Description of the Prior Art

Known prior art control rod drives mount snubber assemblies to the upper extension of a control rod drive housing to decelerate the drop of control rods during reactor shut down. The dropping of the control rods into the reactor is known as a "scram" condition. Such snubber assemblies are mounted above the nuclear reactor when the control rod drive is mounted thereto and depend upon the control rod drive housing being filled with liquid to insure proper snubbing action. An example of such a prior art snubber assembly may be found in U.S. Pat. No. 3,822,439 issued to Robert A. Wallin et. al. Should the control rod drive housing be low on liquid, a dry "scram" condition will occur and the dropping of the control rod will not be properly decelerated causing the leadscrew connected control rod to drop too rapidly damaging both the control rod drive and the nuclear reactor.

The above mentioned prior art snubber assemblies also mount a stacked Belleville washer type buffer spring assembly at the end of the snubber assembly to absorb shock caused by the "scram" condition including dry "scram" conditions. However, such spring assemblies are costly and tend to lose their efficiency with continued use.

SUMMARY OF THE INVENTION

The mentioned problem inherent in the prior art devices are effectively solved by the present invention. The present invention mounts a unique snubber assembly near the control rod connecting end of a leadscrew of a control rod drive to insure that when the control rod drive is mounted to a nuclear reactor the snubber assembly will always be located internally of the liquid filled nuclear reactor. As such the likelihood of a dry "scram" condition is minimized and the need for expensive buffer spring assemblies is obviated.

The snubber assembly of the present invention includes a cylindrical cartridge within which a piston assembly is made to move with the leadscrew of the control rod drive. The cartridge is connected to the nuclear reactor mounting end of the control rod drive to allow the control rod connecting end of the leadscrew to movably extend through the cartridge. The end of the cartridge nearest the control rod is sealed and forms a snubber cylinder portion which provides a reduced clearance area for the piston assembly than the remaining portions of the snubber cartridge. The leadscrew has the snubber piston assembly formed thereon to move with the leadscrew but only in the area enclosed by the cartridge. As the piston moves in the cartridge with movement of the leadscrew, the speed of its movement is decelerated by having to force liquid out of the cartridge around the clearance area of the snubber cylinder since the end of the cartridge is sealed.

In a specific embodiment of the invention the cartridge is formed to define three specific snubbing portions. The first portion is furthest from the control rod and has a series of annular openings for exhausting liquid from the cartridge as the snubber piston moves into the cartridge. The second portion is proximate to the first portion and is free of any annular openings but provides a predetermined clearance around the diameter of the snubber piston. As the snubber piston moves through the second portion it forces liquid back around the clearance between the piston and the second portion and into the first portion from which the liquid is exhausted through the annular openings. The third portion is proximate to the second portion and provides a reduced clearance around the diameter of the piston less than the clearance provided by the second portion. The third portion is also free of any annular openings. As the snubber piston moves through the third portion liquid is forced with more difficulty through the restricted clearance back around the piston and into the second and first portions thereby effectively decelerating the movement of the leadscrew and the control rod connected thereto.

To insure that the control rod drive will not exert any torque on the control rod connected thereto a torque taker assembly is mounted within the snubber assembly. This torque taker assembly includes a guide member longitudinally mounted internally of the snubber cartridge which mates with a key formed on the snubber piston to move within the guide member and limit the piston to longitudinal movement therealong. The guide member accepts any torque applied by the leadscrew.

From the foregoing it will be seen that one aspect of the present invention is to provide a snubber cartridge assembly that will have little likelihood of operating in a dry "scram" condition.

Another aspect of the present invention is to provide a snubber assembly that is purely hydraulic and requires no buffer springs to absorb shock from any type of "scram" conditions.

Yet another aspect of the present invention is to provide a snubber assembly that will effectively prevent any torque from being transmitted to the control rod from the leadscrew of a control rod drive.

These and other objects of the present invention will become more apparent after consideration of the following description of the preferred embodiment and the accompanying drawings.

BRIEF DESCRIPTION OF THE DRAWINGS

FIG. 2 is an expanded view of the snubber assembly of FIG. 1 depicting the snubber piston in the fully extended position.

FIG. 3 is a cross-sectional view taken along 3—3 of the torque taker of the snubber assembly of FIG. 2.

DESCRIPTION OF THE PREFERRED EMBODIMENT

Figure 1A:
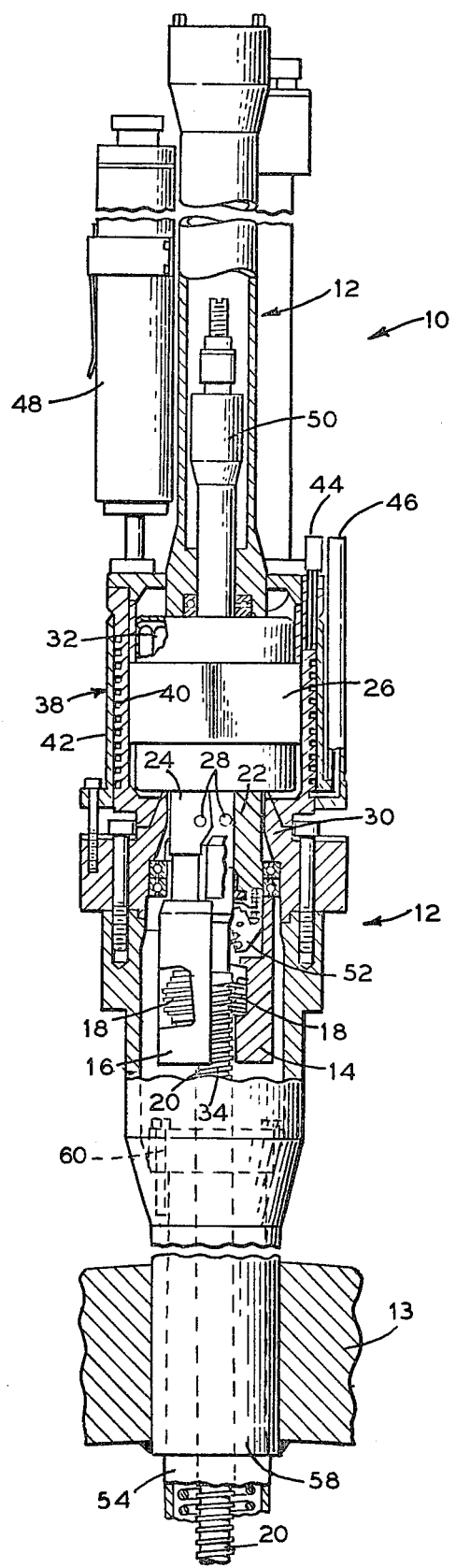
FIGS. 1A and 1B are diametric longitudinal sectional views adapted to be successively arranged in axially aligned abutting relation to provide a depiction of a control rod drive assembly incorporating the snubber assembly of the present invention with the control rod drive mounted to a nuclear reactor vessel.

Referring now to the drawings it will be understood that the showings therein are made for the purposes of describing a preferred embodiment of the invention and are not intended to limit the invention thereto.

FIG. 1 shows a control rod drive assembly 10 having tubular housing 12 which is formed of a plurality of aligned sections welded together in sealed relation. The open end 11 of the housing 12 is adapted to be sealably secured in a standing position to a reactor vessel 13 of a water-containing reactor by welding it thereto. The middle section of the housing 12 contains a pair of lever arms 14 and 16 each of which carries a roller nut 18. Each roller nut 18 is swingable with its respective lever arms 14 and 16 into and out of meshing engagement with an axial screw shaft or lead screw housing 20. The lead screw 20 extends downwardly through the end of the housing 12 and into the reactor vessel 13 where it is coupled to a control rod (not shown) of the reactor in a manner known to those skilled in the art.

The lever arms 14 and 16 which carry the roller nuts 18 are integral with arms 22 and 24 respectively which extend upwardly therefrom within a motor section 26 of the housing 12 and together with arms 14 and 16 defined levers of the first class pivotable on pins 28. The pins 28 are mounted to a rotor carrier body 30 of the housing 12. The arms 22 and 24 form segments of a rotor of an induction motor assembly, as is well known, so that when stator windings 32 are energized sequentially by a polyphase current, the rollers 18 are pivoted into engagement with the leadscrew 20 and cause the leadscrew 20 to move in a linear direction. More specifically, the rollers 18 planetate to linearly drive the non-rotating lead screw 20 and thereby the control rod connected thereto. The lead screw 20 is also supportable in a fixed stationary position by maintaining a non-rotating field current in the stator windings 32. This allows the rollers 18 to remain engaged with threads 34 of the lead screw 20. If the field in the stator 32 collapses completely, the rollers 18 are unmeshed from the threads 34 by a biasing spring (not shown) and the leadscrew 20 and the control rod attached thereto are allowed to quickly drop into the reactor core under the force of gravity and spring pressure to shut down the reactor. This is usually referred to as a "scram" condition.

The stator 32 is located externally of the motor section 26 of the housing 12. The motor section 26 is usually formed of a material such as magnetic stainless steel or clad and plated carbon steel to enhance the magnetic coupling between the stator and the segment arms 22 and 24. Since the stator heats up during operation, the stator 32 is enclosed by a water jacket assembly 38 which has a metal sleeve 40 in which a helical peripheral water channel is formed on the outside surface. The convolutions of the water channel are enclosed by an external sleeve 42 and cooling fluid is conducted to and from the water jacket assembly 38 through inlet and outlet connections 44 and 46 to dissipate the heat generated by the stator 32.

As the lead screw 20 is moved up and down into the reactor vessel by the energized action of the stator 32 engaging the rollers 18 of the lever arms 22 and 24 to the lead screw 20, the position of the lead screw 20 is monitored by a position indicating assembly 48. The position indicating assembly 48 has a series of micro-switches (not shown) which are actuated by a permanent magnet 50 mounted on an upper extension of the lead screw 20.

The construction and operation of the foregoing is well known and a more detailed explanation thereof may be found in U.S. Pat. No. 3,822,439.

It will be appreciated that the control rod drive housing 12 is pressurized to the pressure of the nuclear reactor vessel 13 by its sealed connection thereto. Since the pressures in a nuclear reactor may be in the area of 2,000 psi, clearly a dangerous condition may exist should the housing 12 rupture. The lead screw 20 would then be shot out of the housing 12 due to the pressure difference between the ambient and the housing 12. To prevent the lead screw 20 from being ejected out of the housing 12 in such a rupture condition, an anti-ejection assembly 52 is located within the housing 12. This anti-ejection assembly 52 is engageable with the threads 34 of the lead screw 20 whenever the stator windings 32 are de-energized. Even when thusly engaged, the anti-ejection assembly 52 will allow the leadscrew 20 to ratchet with the assembly 52 and still allow a "scram" condition. Should the leadscrew 20 start moving in an opposite direction indicating an attempted ejection, the anti-ejection assembly 52 will then move with the leadscrew 20 to wedge the leadscrew 20 to the inside wall of the housing 12 to prevent the ejection of the leadscrew 20 from the housing 12. A more detailed explanation of such an anti-ejection mechanism may be found in the Applicant's co-pending application Ser. No. 550,250.

During the "scram" condition wherein the leadscrew 20 must be quickly inserted into the reactor, some means is required to decelerate the leadscrew 20 to prevent it from hitting the end of the control rod drive 10 under the full momentum of the drop and damaging the drive 10. To this end a snubber cartridge assembly 54 is mounted to the reactor vessel 13 end of the housing 12 so as to be located internally of the water filled vessel 13 when the control rod drive 10 is mounted thereto. This particular mounting of the snubber cartridge assembly 54 insures that the snubber assembly will always be located inside the liquid filled vessel 13 and therefore the cartridge assembly 54 will also be filled with water making a dry "scram" condition during which the snubber 54 would be inoperative extremely unlikely.

Figure 1B:
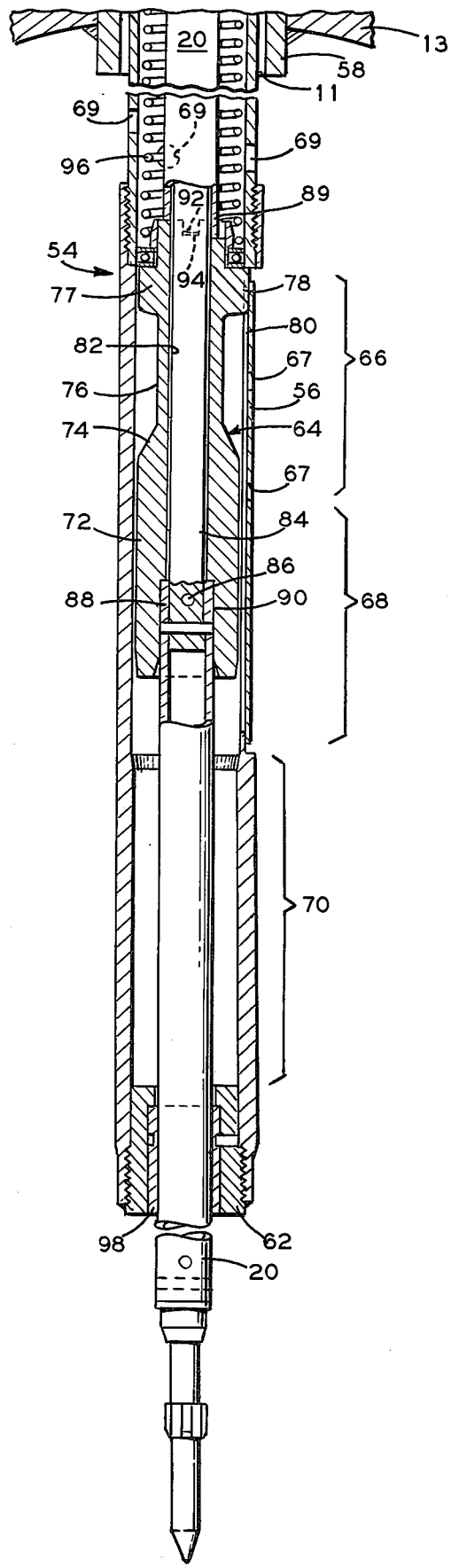

As may be best seen with reference to FIGS. 1B and 2, the snubber cartridge assembly includes a tubular housing 56 which is affixed to a nozzle portion 58 of the housing 12 by screws 60 (FIG. 1A). The opposite end of the snubber cartridge assembly 54 is sealed by an end cap 62 through which the leadscrew 20 slidably extends.

The housing 56 is formed to have three distinct areas 66, 68, and 70 each of which provide a predetermined snubbing action in conjunction with a snubber piston assembly 64 mounted to the leadscrew 20 so as to be located internally of the housing 56.

The first area 66 of the housing 56 provides a large clearance for a piston 72 of the assembly 64 in the range of 0.044 to 0.052 inches around the outside diameter of the piston 72 and has a series of annular openings 67 for exhausting water in front of the piston assembly 64 therethrough as the piston assembly 64 moves through this first area 66. Thus the first area 66 provides minimal snubbing action to allow the control rod to be speedily inserted into the reactor to initiate its shut down.

Once the control rod is inserted into the reactor an increased snubbing action is initiated by the second area 68. The second area 68 provides the same clearance for the piston assembly 64 as the first area 66 but is free of any openings. Thus water in front of the piston assembly 64 must be forced back around the piston assembly 64 and into the first area 66 where it is exhausted as the piston assembly 64 moves through this second area 68.

Once the piston assembly 64 enters the third area 70 consideration must be given to positively stopping the piston assembly 64. To this end the third area 70 provides a reduced clearance for the piston of the assembly 64 in the range of 0.012 to 0.015 inches around the diameter of the piston 72 and is also formed to be free of any openings. Thus as the piston assembly 64 moves through this area 70 the water is forced back around the piston assembly 64 and into the second and first areas 68 and 66 to be exhausted therefrom with increased difficulty to positively decelerate the piston assembly to a stop.

The piston assembly 64 is designed to enhance water flow around it and includes an angled portion 74 formed on the piston 72 which tapers down to a narrow neck portion 76. The Applicant has found that the angled portion 74 provides less resistance to water flowing back around the piston 72 than a sharp perpendicular cutback to the neck portion 76 and thereby provides smoother snubbing action.

The opposite end of the neck portion 76 has an enlarged diameter portion 77 with a series of key portions 78 which ride in grooves 80 to provide a torque restraint for the leadscrew 20 as best seen in FIG. 3. This torque restraint assembly prevents the leadscrew 20 from rotating when it is released from the linear driving mechanism during a "scram" condition.

To provide a positive mounting of the piston assembly 64 to the leadscrew 20, the piston assemly 64 is formed to have a circular opening 82 extending therethrough through which an inner rod 84 of the leadscrew 20 is made to extend and connect both ends 88 and 89 of the leadscrew 20. The inner rod 84 is connected to the control rod end 88 of leadscrew 20 by a bolt 86. The control rod end 88 of the leadscrew 20 is also made to press into an enlarged annular opening 90 formed in the end of the piston 72. The other end 89 of the leadscrew 20 is made to have a series of teeth 92 which mate with grooves 94 formed in the key 78 end of the piston assembly 64. Thus the piston assembly 64 is captured between the two ends 88 and 89 of the leadscrew 20.

In operation when the leadscrew is driven from its FIG. 2 position to retract the control rod out of the nuclear reactor, the piston assembly 64 is made to move against a spring 96 compressing it and storing energy therein. Full retraction of the control rod moves the piston 72 up into the first area 66 below the opening 69 which acts as a vent for fluid above the piston assembly 64, as shown in FIG. 1. If a "scram" condition were to occur, the threads 34 of the leadscrew 20 would be released by the rollers 18 and the leadscrew 20 would start moving to its FIG. 2 position under the force of gravity and the force of the spring 96. The movement of the piston assembly 64 through the first area 66 is relatively unrestricted since the spring 96 force is at its greatest and the openings 67 allow the water in front of the piston 72 to be easily exhausted from the cartridge assembly 54 through the openings 67. The opening 69 prevents any suction force from being developed above the piston assembly 64. As the piston 72 enters the second area 68 the lack of any openings forces the water in front of the piston to be forced back around the piston 72 through the clearance between the piston 72 and the housing 56 into the neck portion 76 and therefrom to the first area 66 where the water is exhausted through the openings 67. This causes a significant deceleration of the piston assembly 64. As the piston 72 enters the third reduced clearance area 70 water in front of the piston 72 is forced back around the piston 72 with more difficulty due to the reduced clearance. The spring 96 force is also close to the minimum value. Thus the piston assembly 64 is thereby completely decelerated to gradually ease itself into its FIG. 2 position without damaging the control rod drive 10.

Upon raising of the piston assembly 64 by the control rod drive 10 water flows into the cartridge assembly 54 to fill the space in front of the piston 72 through the clearance between the piston 72 and the housing 56. It should be recognized that some water leakage also occurs between the end cap 62 and the cartridge assembly 54 due to the minimal clearance provided between the leadscrew 20 and a leadscrew guide 98 in the end cap 62. This clearance is in the range of 0.0095 to 0.0120 inches around the diameter of the leadscrew housing 20 and is provided to minimize resistance to leadscrew travel rather than act as an orifice for water flow into and out of the snubber cartridge 54. It is possible that when the piston moves very rapidly upward from a "scram" position, a void may occur temporarily below the piston due to the close clearances in the area 70 and the unrestricted areas above the piston (holes 67 and 69). However this void will quickly fill up through leakage.

in view of the foregoing it will be appreciated that the snubber assembly 54 of the present invention provides a snubber that will always be operative since there is little likelihood of a dry "scram" condition occurring due to the reactor vessel always being filled with water. The snubber of the present invention also provides three different degrees of snubbing action which are sequential and of increasing magnitude to allow a speedy insertion of the control rod while still insuring that the snubber piston will be properly decelerated before full insertion of the control rod.

Certain modifications and improvements will occur to those skilled in the art upon reading this specification. It will be understood that such were deleted for the sake of conciseness and readability but are within the scope of the appended claims.

What I claim is:

1. A three-portion snubber assembly for decelerating a control rod dropping into a Liquid Filled nuclear reactor comprising:

piston means mounted proximate to an end of a leadscrew of the control rod drive to be movable with the leadscrew;

enclosure means extending partially around the leadscrew to allow said piston means to move therein, said enclosure means being locatable within the Liquid Filled nuclear reactor whenever the control rod drive is mounted thereto; and said enclosure means having a first portion providing a series of openings to allow any liquid within the control rod drive to be exhausted therethrough in response to movement of said piston means through the first portion of said enclosure means, a second portion formed next to said first portion to provide a predetermined clearance for the movement of said piston means therein and a third portion formed proximately to said second portion to provide a decreased clearance less than the predetermined clearance of said second portion for the movement of said piston means therein.

2. A snubber assembly as set forth in claim 1 wherein said piston means includes a piston having a main piston body and having a keyed collar portion and wherein said enclosure has a longitudinal guide member formed therein to fit a key of said collar portion of said piston to constrain the movement of said piston to a path determined by said guide member.

3. A snubber assembly for a control rod drive of a liquid filled nuclear reactor comprising:
    a cylindrical cartridge connected to the nuclear reactor mounting end of the control rod drive to be locatable substantially within the liquid filled nuclear reactor;
    a leadscrew of the control rod drive sealably extending through said cylindrical cartridge and having a piston area formed thereon to move within said cylindrical cartridge in response to movement of said leadscrew; and wherein
    said cylindrical cartridge includes a first portion proximate the control rod drive and having a series of openings therein, a second portion proximate to said first portion and having a predetermined clearance for said snubber piston, and a third portion proximate to said second portion and having a predetermined clearance for said snubber piston less than the clearance in said second portion.

4. A snubber assembly as set forth in claim 3 including torque restraint means for preventing torque transmission from the control rod drive to a control rod of the nuclear reactor.

5. A snubber assembly as set forth in claim 4 wherein said torque restraint means includes:
    a guide member longitudinally mounted to an inside wall of said cylindrical cartridge; and
    said snubber piston having a key formed thereon to mate with said guide member to allow longitudinal movement of said snubber piston therealong while allowing any torque exerted by said snubber piston to be accepted by said guide member.

6. A snubber assembly as set forth in claim 5 wherein said guide member is longitudinally mounted in said first and second portion of said cylindrical cartridge.

7. A snubber assembly as set forth in claim 3 wherein said piston area of said leadscrew includes a main piston having a first piston area of a first diameter and a second piston area of a second diameter less than said first diameter.

8. A snubber assembly as set forth in claim 7 wherein said piston area of said leadscrew includes an angularly tapered portion joining said first piston area to said second piston area.

9. A snubber assembly as set forth in claim 8 wherein said first piston area includes a recess for pressing one end of said leadscrew therein.

10. A snubber assembly as set forth in claim 9 wherein the second end of said leadscrew forms a series of tooth sections and said second piston area forms a series of grooves matable with said tooth sections.

* * * * *